United States Patent
Falk et al.

(10) Patent No.: US 10,051,465 B2
(45) Date of Patent: Aug. 14, 2018

(54) METHOD AND SYSTEM FOR SECURELY TRANSFERRING A MESSAGE

(75) Inventors: Rainer Falk, Erding (DE); Hans-Joachim Hof, Ingolstadt (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 1020 days.

(21) Appl. No.: 13/201,041

(22) PCT Filed: Dec. 15, 2009

(86) PCT No.: PCT/EP2009/067148
§ 371 (c)(1),
(2), (4) Date: Aug. 11, 2011

(87) PCT Pub. No.: WO2010/091760
PCT Pub. Date: Aug. 19, 2010

(65) Prior Publication Data
US 2011/0312284 A1 Dec. 22, 2011

(30) Foreign Application Priority Data
Feb. 11, 2009 (DE) .................. 10 2009 008 535

(51) Int. Cl.
*H04W 12/06* (2009.01)
*H04B 7/04* (2017.01)
*H04L 29/06* (2006.01)

(52) U.S. Cl.
CPC .............. *H04W 12/06* (2013.01); *H04B 7/04* (2013.01); *H04L 63/1458* (2013.01)

(58) Field of Classification Search
CPC .................................................. H04W 12/06
(Continued)

(56) References Cited

U.S. PATENT DOCUMENTS 7,002,470 B1 * 2/2006 Miao ................. 340/539.22
2004/0266339 A1 * 12/2004 Larsson .................. 455/7
(Continued)

FOREIGN PATENT DOCUMENTS

WO    2005/067538 A2    7/2005    ............ H04B 7/216
WO    2010/091760 A1    8/2010    ............... H04B 7/04

OTHER PUBLICATIONS

Yu P.L. et al. "Physical-Layer Authentication" IEEE Transactions on Information Forensics and Security, IEEE Piscataway, NJ, US, vol. 2, No. 1, Mar. 1, 2008, pp. 38-51 (14 pages).
(Continued)

*Primary Examiner* — Wen Huang
(74) *Attorney, Agent, or Firm* — Slayden Grubert Beard PLLC

(57) ABSTRACT

In a method and system for securely transferring a message (N) from a transmitter unit (SE) to a receiver unit (EE), a message sent by a transmitter unit (SE) is thereby transmitted to a receiving antenna array (EAA) comprising a plurality of receiving nodes (EK). The receiving nodes (EK) of the receiving antenna array (EAA) each verify the received message as originating from an authorized transmitter unit (SE) before the verified message is forwarded by each receiving node (EK) to the receiving unit (EE). The method and system effectively protects the message transmission from the introduction of undesired data by an attacker, and by an attack wherein the lifespan or operating time of the partially battery-powered nodes is reduced by increased current consumption.

18 Claims, 5 Drawing Sheets

(58) Field of Classification Search
USPC .................................................. 455/410, 411
See application file for complete search history.

(56) References Cited

U.S. PATENT DOCUMENTS

| | | | |
|---|---|---|---|
| 2005/0220322 A1* | 10/2005 | Olesen et al. ................ | 382/100 |
| 2006/0223497 A1* | 10/2006 | Gallagher et al. ............ | 455/410 |
| 2007/0077915 A1* | 4/2007 | Black et al. .................. | 455/411 |
| 2007/0133488 A1* | 6/2007 | Muthuswamy et al. ...... | 370/338 |
| 2007/0255993 A1* | 11/2007 | Yap et al. ..................... | 714/748 |
| 2009/0028262 A1* | 1/2009 | Imai ..................... | H04L 9/0875 |
| | | | 375/267 |

OTHER PUBLICATIONS

Xiao L. et al., "MIMO-Assisted Channel-based Authentication in Wireless Networks" $42^{nd}$ Annual Conference on Information Sciences and Systems, Mar. 19-21, 2008, pp. 642-646 (5 pages).
International Search Report and Written Opinion for Application No. PCT/EP2009/067148 (11 pages).

* cited by examiner

METHOD AND SYSTEM FOR SECURELY TRANSFERRING A MESSAGE

CROSS-REFERENCE TO RELATED APPLICATIONS

This application is a U.S. National Stage Application of International Application No. PCT/EP2009/067148 filed Dec. 15, 2009, which designates the United States of America, and claims priority to German Application No. 10 2009 008 535.1 filed Feb. 11, 2009, the contents of which are hereby incorporated by reference in their entirety.

TECHNICAL FIELD

The invention relates to a method and a system for securely transmitting a message from a transmitter unit to a receiver unit, particularly a receiver unit that receives messages via a receiving-antenna array.

BACKGROUND

The use of MIMO (Multiple Input Multiple Output) refers in the wireless-communication field to employing a plurality of antennas or, as the case may be, transmitting nodes for transmitting data and employing a plurality of antennas or, as the case may be, receiving nodes for receiving data. Said antennas or nodes therein form in each case an antennas array. The antenna array on the sending side is referred to as a transmitting-antenna array and the antenna array on the receiving side as a receiving-antenna array. This kind of signal transmission is used in a wireless communication system to exploit multi-path propagating and thereby limit the impact of signal fading. The term "cooperative MIMO" is used when a plurality of autonomous instances or, as the case may be, nodes form an antenna array for transmitting or, as the case may be, receiving data or, as the case may be, messages. With cooperative MIMO, each antenna is formed by an autonomous node, for example a sensor node, in contrast to antenna arrays that are configured to form a single instance.

In the case of cooperative MIMO, a plurality of instances or transmitting nodes that have received a message from a transmitter unit, emit said data to a receiving-antenna array. Said receiving-antenna array likewise contains a plurality of nodes that receive the transmitted data and deliver it to a receiver unit which constructs the originally transmitted message therefrom.

With the cooperative MIMO method it is possible to employ different techniques for transmitting data from the transmitting-antenna array to the receiving-antenna array with a low error rate.

It possible for the instances or transmitting nodes of the transmitting-antenna array to emit the same data. The receiving nodes of the receiving-antenna array in each case construct, as far as possible, the originally used data from the received data or attempt to reestablish it by means of, for example, a rake filter. Said reconstructed data is conveyed by the receiving-antenna array's receiving nodes to the actual receiver unit, which reconstructs the original message through, for example, a majority decision. That procedure can be referred to also as a widely practiced MISO (Multiple Input Single Output) method.

The transmitting nodes or, as the case may be, instances of the transmitting-antenna array can alternatively in each case emit different data, with said data being the result of a special encoding of the output data or, as the case may be, of the original message originating from the transmitter unit. The data received by the instances or, as the case may be, receiving nodes of the receiving-antenna array constitutes a mixture of the transmitted data. Said data is forwarded by the receiving-antenna array's receiving nodes to the receiver unit, which then reconstructs the original message from the received data of all receiving nodes. With that procedure the individual instances or, as the case may be, receiving nodes of the receiving-antenna array cannot perform reconstructing of the data originally sent.

Another known transmission technique is what is termed the MISO method. With MISO (Multiple Input Single Output), as with the above-described MIMO method a plurality of antennas are used for transmitting a message. However, only one antenna is employed for receiving in the case of MISO.

With conventional, cooperative MIMO transmission techniques the instances or, as the case may be, transmitting nodes of the transmitting-antenna array convey data without first checking whether it originates from an authorized transmitter unit. The instances or, as the case may be, receiving nodes of the receiving-antenna array also forward the received data unchecked to the message's indicated receiver unit. Thus neither on the receiving side nor on the sending side does any authenticating of the data's sender take place. With this conventional procedure the data obtained therefore has to be processed in order to reconstruct the originally sent message and then authenticate the message's sender on the basis of the reconstructed message. Thus the sender of the message will not be authenticated until the message has been reconstructed on the receiving side.

Attackers can exploit this procedure to smuggle in data packets or messages unnoticed. It is also possible for attackers to unnecessarily load the intermediate nodes or, as the case may be, receiving nodes as well as the receiver, for example to increase the computing effort required on the receiving side. That undesired loading on the receiving side can result in undesired exploiting of communication resources from the receiving side, for example in increased power consumption by the participating nodes. The lifespan can thereby be shortened by the attacker in the case particularly of battery-operated nodes, for example receiving nodes of the receiving-antenna array. So with the conventional procedure for transmitting data an attacker can not only carry out a denial-of-service attack but also cause his or her own data to be forwarded.

SUMMARY

According to various embodiments, a method and a device for transmitting a message from a transmitter unit to a receiver unit can be provided, with the method and device both being secure from such kind of attacks.

According to various embodiments, a method for securely transmitting a message from a transmitter unit to a receiver unit may have the steps:
(a) sending the message submitted by the transmitter unit to a receiving-antenna array having a plurality of receiving nodes; and
(b) verifying by the receiving-antenna array's receiving nodes that the received message has originated from an authorized transmitter unit before the verified message is forwarded to the receiver unit by the respective receiving node.

In an embodiment variant of the method the message submitted by the transmitter unit is sent to the receiving-antenna array by a transmitting-antenna array having a plurality of transmitting nodes.

In an embodiment variant of the method, verifying of the received message by the receiving nodes is performed using an authentication token emitted by the transmitting-antenna array's transmitting nodes to the receiving-antenna array's receiving nodes.

In an embodiment variant of the method the authentication token is formed by a generated random value previously exchanged between the transmitter unit and receiver unit.

In an embodiment variant of the method the authentication token is formed by a value of a hash chain.

In an embodiment variant of the method, verifying of the received message by the receiving nodes is performed using an expected message length.

In an alternative embodiment variant of the method, verifying of the received message is performed using an expected transmission pattern.

In an embodiment variant of the method, each receiving node of the receiving-antenna array reconstructs on the basis of the verified message received by it a message still containing transmission errors that is similar to the message emitted by the transmitting-antenna array's transmitting nodes and forwards it to the receiver unit for finally reconstructing the message that has been sent.

In an embodiment variant of the method, on the basis of the verified message still containing transmission errors that was forwarded to the receiver unit by the receiving-antenna array's receiving nodes the receiver unit reconstructs the message originally emitted by the transmitting-antenna array's transmitting nodes.

In an alternative embodiment variant of the method the receiving-antenna array's receiving nodes forward the verified message in each case received by them directly to the receiver unit, with the receiver unit reconstructing the original message emitted by the transmitting-antenna array's transmitting nodes on the basis of all the verified messages forwarded to said unit by the receiving nodes.

In another embodiment variant of the method the transmitting-antenna array's transmitting nodes transmit the message to the receiving-antenna array's receiving nodes in encoded form.

According to other embodiments, a system for securely transmitting a message from a transmitter unit to a receiver unit, may have:
(a) a transmitter unit which is connected to a transmitting-antenna array having a plurality of transmitting nodes;
(b) a receiver unit which is connected to a receiving-antenna array having a plurality of receiving nodes;
(c) with each receiving node of the receiving-antenna array verifying a message received from the transmitting-antenna array's transmitting nodes as originating from an authorized transmitter unit before the respective receiving node forwards the message received by it to the receiver unit.

In an embodiment variant of the system, verifying of the received message by a receiving node of the receiving-antenna array is performed using an authentication token, using an expected message length or using an expected transmission pattern.

According to yet other embodiments, in a receiving node for a receiving-antenna array, the receiving node verifying a message received from transmitting nodes of a transmitting-antenna array as a message originating from an authorized transmitter unit connected to the transmitting-antenna array before the receiving node forwards the received message to a receiver unit.

In a possible embodiment variant of the receiving node it can be switched over between a MIMO (Multiple Input Multiple Output) operating mode and a MISO (Multiple Input Single Output) operating mode.

According to yet other embodiments, a receiving device may have:
an assigned receiving-antenna array having a plurality of receiving nodes; and
a receiver unit for reconstructing a message that has been sent,
with each receiving node of the receiving-antenna array verifying a message received from the transmitting-antenna array's transmitting nodes as originating from an authorized transmitter unit before the respective receiving node forwards the message received by it to the receiver unit.

According to yet other embodiments, a computer program may have program instructions for implementing the method for securely transmitting a message from a transmitter unit to a receiver unit, having the steps:
(a) sending the message submitted by the transmitter unit to a receiving-antenna array having a plurality of receiving nodes; and
(b) verifying by the receiving-antenna array's receiving nodes that the received message has originated from an authorized transmitter unit before the verified message is forwarded to the receiver unit by the respective receiving node.

According to yet other embodiments, a data carrier may store a computer program of such kind.

BRIEF DESCRIPTION OF THE DRAWINGS

Embodiment variants of the method and of the receiving device as well as of the system for securely transmitting a message from a transmitter unit to a receiver unit are described below with reference to the attached figures, in which.

DETAILED DESCRIPTION

Figure 1:
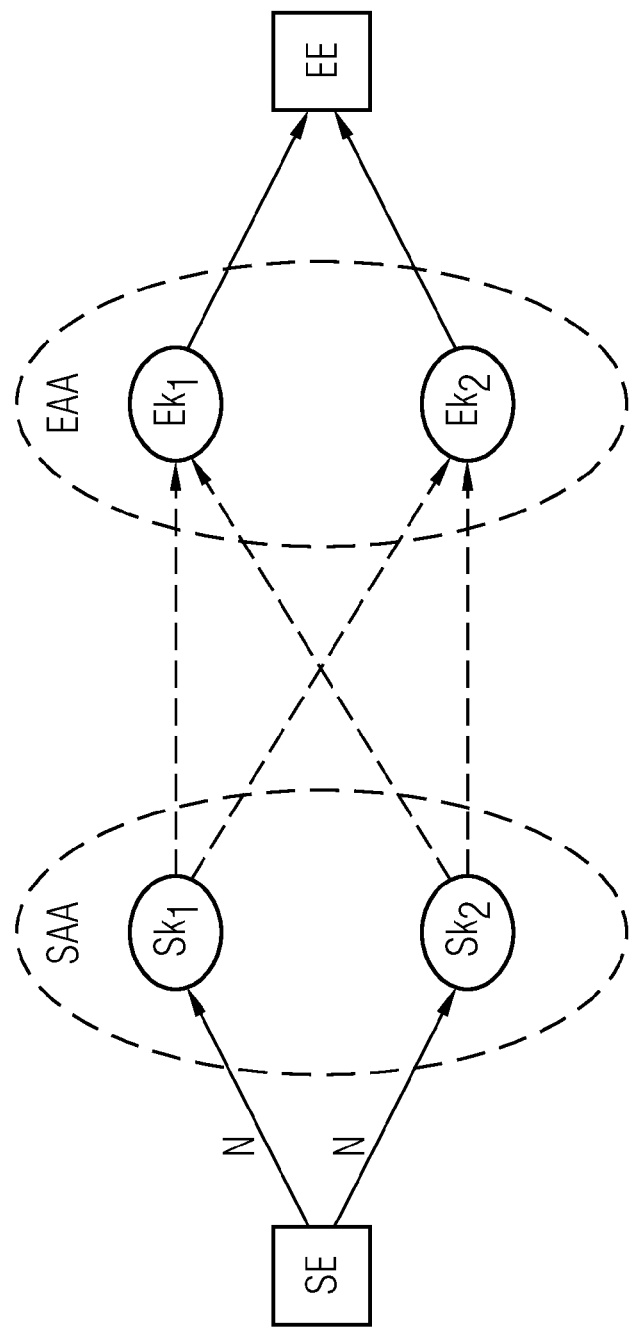
FIG. 1 is a diagram representing a possible embodiment variant of an system for securely transmitting a message.

As can be seen from FIG. 1, in the embodiment variant presented there, the system for securely transmitting a message from a transmitter unit SE to a receiver unit EE according to various embodiments includes a transmitting-antenna array SAA connected to transmitter unit SE and a receiving-antenna array EAA connected to receiver unit EE. Transmitting-antenna array SAA therein comprises a plurality of transmitting nodes SK and receiving-antenna array EAA has a plurality of receiving nodes EK. Said transmitting nodes SK or, as the case may be, receiving nodes EK constitute autonomous instances, meaning they form mutually separate nodes. Each of the receiving nodes EK can have its own receiving antenna. Each transmitting node SK of transmitting-antenna array SAA can similarly have its own transmitting antenna. A message submitted by transmitter unit SE is broadcast or, as the case may be, emitted by transmitting node SK of transmitting-antenna array SAA to receiving-antenna array EAA. Transmitter unit SE transmits the messages first to transmitting nodes SK of transmitting-antenna array SAA, meaning to transmitting nodes SK1, SK2, as shown in FIG. 1. Transmitting-antenna array SAA can comprise a multiplicity of transmitting nodes SK, for example N transmitting nodes SK. Said transmitting nodes SK emit the message. The message can in a possible embodiment variant therein be emitted in a modified form, for example encoded. Receiving nodes EK of receiving-antenna array EAA, meaning receiving nodes EK1, EK2, as shown in FIG. 1, in each case receive said radiated messages of transmitting nodes SK1 and SK2. It is therein possible for receiving nodes EK1, EK2 to receive a message incompletely or with errors. In a possible embodiment variant, receiving nodes EK1, EK2 forward the received data or information to receiver unit EE, which thereupon reconstructs the original message. With the method, verifying by receiving nodes EK of receiving-antenna array EAA that the received message has originated from an authorized transmitter unit SE takes place before said verified message is forwarded by the respective receiving node EK to receiver unit EE.

In a possible embodiment variant of the method, verifying of the received message by receiving nodes EK is performed using an authentication token emitted by transmitting nodes SK of transmitting-antenna array SAA to receiving nodes EK of receiving-antenna array EAA. In an embodiment variant, the authentication token is formed by a generated random number or, as the case may be, random value previously exchanged between transmitter unit SE and receiver unit EE. In an embodiment variant of the method, checking information of transmitting-antenna array SAA assigned to transmitter unit SE is in each case added by transmitting nodes SK of transmitting-antenna array SAA. Said checking information can in an embodiment variant already be added by transmitter unit SE. The added checking information is in both embodiment variants checked by receiving nodes EK of receiving-antenna array EAA. Said checking information is formed by, for example, the above cited authentication token. The data received in each case by receiving nodes EK is forwarded to receiver unit EE depending on the check performed on the checking information or, as the case may be, authentication token on the receiving side. The checking information or, as the case may be, authentication token serves to authenticate whether the received data originates from transmitting-antenna array SAA of transmitter unit SE. In a possible embodiment variant, the checking information or, as the case may be, authentication token is transmitted encoded by means of a error-correcting encoding method so that the data will still be correctly decoded by receiving nodes EK of receiving-antenna array EAA even if there are transmission errors on the interface between transmitting-antenna array SAA and receiving-antenna array EAA.

The checking information is in an embodiment variant formed by a cryptographic checksum. It is furthermore possible to employ what is termed a security token, which is to say information similar to an access password. That can specifically be a certain bit sequence. Whereas the cryptographic checksum is linked to the data, meaning it becomes invalid if the data is modified, that is not the case with the security token. It will therefore be advantageous to employ a security token when it is also required to selectively check incorrectly received data.

The reference information needed for computing or, as the case may be, checking the added checking information can be made known in different ways to the nodes of transmitting-antenna array SAA or, as the case may be, to receiving nodes EK of receiving-antenna array EAA. For example reference information can be co-transmitted within the scope of an RTC/CTS exchange between transmitter unit SE and receiver unit EE preceding actual data transmission. The array nodes, meaning transmitting nodes SK of transmitting-antenna array SAA and receiving nodes EK of receiving-antenna array EAA, are able to listen in on- and in a possible embodiment variant locally store—the co-transmitted reference information. In an alternative embodiment variant, the nodes of transmitting-antenna array SAA obtain the reference information from transmitter unit SE or, as the case may be, receiver unit EE.

Transmitter unit SE and receiver unit EE can in an embodiment variant in each case derive reference information from an existing end-to-end security relationship using key derivation. Transmitter unit SE can therein make the derived reference information available to transmitting nodes SK of transmitting-antenna array SAA and receiver unit EE can make the derived reference information available to receiving node EK of receiving-antenna array EAA.

Different approaches can be used in the method for authenticating transmitting-antenna array SAA to receiving-antenna array EAA according to various embodiments. It is not the individual instances or, as the case may be, nodes of transmitting-antenna array SAA that are therein authenticated; instead, transmitting-antenna array SAA is authenticated in its entirety to receiving-antenna array EAA. A cryptographic checksum of the transmitted data is used in an embodiment variant for authenticating. A key, for instance, which transmitter unit SE and receiver unit EE have previously exchanged can be used for that purpose. Said exchanged key makes transmitter unit SE known to the instances or, as the case may be, transmitting nodes SK of transmitting-antenna array SAA and receiver unit EE to the instances or, as the case may be, receiving nodes EK of receiving-antenna array EAA. That is done using confidential and integrity-protected data transmission. A cryptographic checksum, for example MAC, cannot be conveyed unless the data is reconstructed on each individual instance or, as the case may be, node of receiving-antenna array EAA. The reconstructed data will, though, in many cases still contain errors because of transmission errors so that checking of the cryptographic checksum can also fail in said cases. Thus in an embodiment variant of the method an authentication token is used that is transmitted together with the actual data, for example prefixed thereto. Not until said authentication token has been successfully received by the respective receiving nodes EK or, as the case may be, instances of receiving-antenna array EAA will the remaining or, as the case may be, useful data be received or, as the case may be, processed, for example forwarded to receiver unit EE.

Authentication tokens can be used also when receiving nodes EK of receiving-antenna array EAA do not reconstruct the data originally sent but when reconstructing is instead carried out by receiver unit EE.

The data can in a possible embodiment variant be reconstructed in two stages, namely first by receiving nodes EK of receiving-antenna array EAA and then by receiver unit EE. In that embodiment variant, each receiving node EK of receiving-antenna array EAA reconstructs on the basis of the verified message received by it a message still containing transmission errors that is similar to the message emitted by transmitting node SK of transmitting-antenna array SAA, and forwards said message still containing transmission errors to receiver unit EE for finally reconstructing the message that has been sent. On the basis of the messages, verified but still containing transmission errors, received by the various receiving nodes EK of receiving-antenna array EAA or forwarded to the receiver unit, receiver unit EE then reconstructs the message originally emitted by transmitting node SK of transmitting-antenna array SAA.

The original message is in an alternative embodiment variant reconstructed solely by receiver unit EE. Receiving nodes EK of receiving-antenna array EAA therein forward the verified message in each case received by them directly to the receiver unit, with receiver unit EE then reconstructing the original message emitted by transmitting nodes SK of transmitting-antenna array SAA on the basis of all the verified messages forwarded to said unit by receiving nodes EK.

If the originally sent data or message is reconstructed not by the instances of receiving-antenna array EAA but instead by receiver unit EE, the authentication token will be transmitted preferably not using an MIMO method but using an MISO method. That is simple to implement as all that is needed on the sending side is to select a different encoding. Individual instances or, as the case may be, nodes of receiving-antenna array EAA can then autonomously transmit the authentication token that was transmitted using the MISO method and thereby authenticate the data emitted by transmitting-antenna array SAA.

The authentication token is formed in an embodiment variant by a random value that is exchanged between transmitter unit SE and receiver unit EE by means of, for example, a preceding RTS/CTS.

The authentication token is formed in another embodiment variant by a value of a hash chain. Transmitter unit SE for that purpose notifies receiver unit EE for example within the scope of an RTS/CTS of the obligation to employ a certain hash chain. The respective next value H (n−1) of the hash chain will then be used as the authentication token. In that embodiment variant it is possible to send data not just once but several times without therein having each time to notify receiving nodes EK of receiving-antenna array EAA of a new authentication token. In each case the hash chain's preceding element or link is used as the authentication token for verifying, i.e. one after the other:

H(n−1), H(n−2), H(n−3), . . . H(0).

In another embodiment variant of the method, verifying of the received message by receiving nodes EK is performed using an expected message length. In that embodiment variant, transmitting-antenna array SAA is authenticated to the instances of receiving-antenna array EAA using details about the amount of data to be received. Said message length to be expected is notified to receiving nodes EK of receiving-antenna array EAA by receiver unit EE. A receiver will know the number of data items to be received or, as the case may be, the message length for example if an exchange announcing the transmission has previously taken place with transmitter unit SE. Receiving nodes EK of receiving-antenna array EAA will in that embodiment variant forward the received data or, as the case may be, messages to receiver unit EE only if the received data or, as the case may be, the message has the expected message length.

In another embodiment variant of the method, transmitting-antenna array SAA is authenticated to receiving nodes EK of receiving-antenna array EAA using an expected transmission pattern or, as the case may be, a traffic pattern of the data to be received. Transmitting messages for example every ten seconds would be an example of a data-transmission pattern of such kind. Said transmission pattern is notified to receiving nodes EK of receiving-antenna array EAA by receiver unit EE. Receiver unit EE for its part knows the traffic pattern or, as the case may be, transmission pattern owing to, for example, a previous exchange with transmitter unit SE, say within the scope of an RTS/CTS exchange. It is furthermore possible for the data-transmission pattern to be known to receiver unit EE owing to the respective application, for example when measured values are transmitted periodically. Receiving nodes EK of receiving-antenna array EAA will in that embodiment variant forward the received data only if transmitting of the messages corresponds to the predefined transmission pattern.

In a possible embodiment variant, receiver unit EE transmits checking criteria for useful data to the receiving nodes EK of receiving-antenna array EAA. Since said useful data may have been modified in receiving nodes EK of receiving-antenna array EAA owing to transmission errors, only a similarity check is performed in this embodiment variant. For example an expected value can have been specified for a sender's address, a recipient's address, or a useful-data content. The received data will be forwarded by the receiving nodes of receiving-antenna array EAA to receiver unit EE if there is sufficient similarity. Sufficient similarity can be provided if, for example, the data differs by at most n bits.

In a possible embodiment variant of the system the transmission of data from transmitter unit SE to the nodes of transmitting-antenna array SAA and the transmission of data from the nodes of receiving-antenna array EAA to receiver unit EE is likewise cryptographically protected. That can be done by means of, for example, a cryptographic MAC (Message Authentication Code) checksum. Transmitter unit SE therein authenticates a message to transmitting node SK of transmitting-antenna array SAA. That can be done using, for example, existing security relationships between the instances of transmitting-antenna array SAA and transmitter unit SE. A further security relationship can alternatively be set up. Different versions of a security relationship of such kind are possible. In a possible embodiment variant there is a security relationship for a link, meaning between transmitter unit SE and one of transmitting nodes SK of transmitting-antenna array SAA, using an associated link key, for instance. In an alternative embodiment variant there is a security relationship between transmitter unit SE and all transmitting nodes SK of transmitting-antenna array SAA, for example a transmitting-antenna-array key that is made known by transmitter unit SE to all transmitting nodes SK or instances of transmitting-antenna array SAA. It is furthermore possible for there to be a security relationship between all the nodes in the network, for example a network key.

The instances or, as the case may be, receiving nodes EK of receiving-antenna array EAA can also authenticate their messages to receiver unit EE. Existing security relationships can be used here, too, or new security relationships employed.

Figure 2:
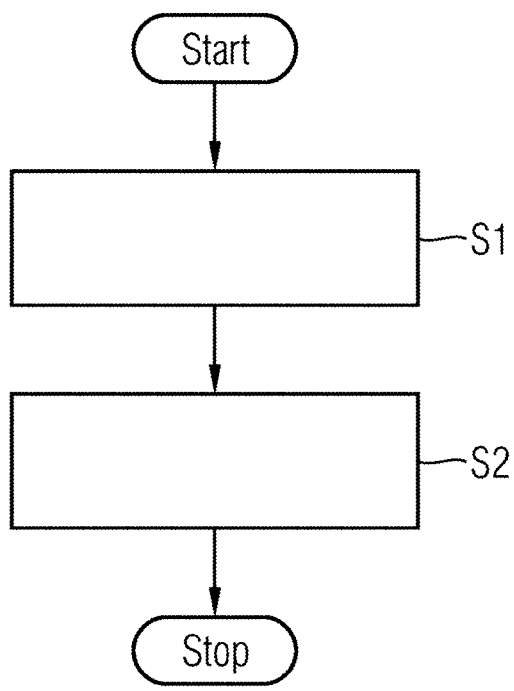
FIG. 2 is a flowchart representing a possible embodiment variant of the method.

FIG. 2 is a simple flowchart representing a possible embodiment variant of the method for securely transmitting a message from a transmitter unit SE to a receiver unit EE, as shown in FIG. 1.

A message issued by transmitter unit SE is emitted at a step S1 to a receiving-antenna array EAA that has a plurality of receiving nodes EK. The message is therein as a rule emitted by transmitting nodes SK of a transmitting-antenna array SAA, as shown in FIG. 1.

The received message is at a second step S2 verified by receiving nodes EK of receiving-antenna array EAA as originating from an authorized transmitter unit SE. The verified message will be forwarded at step S2 by the respective receiving nodes EK to receiver unit EE if verifying was successful.

Figure 3:
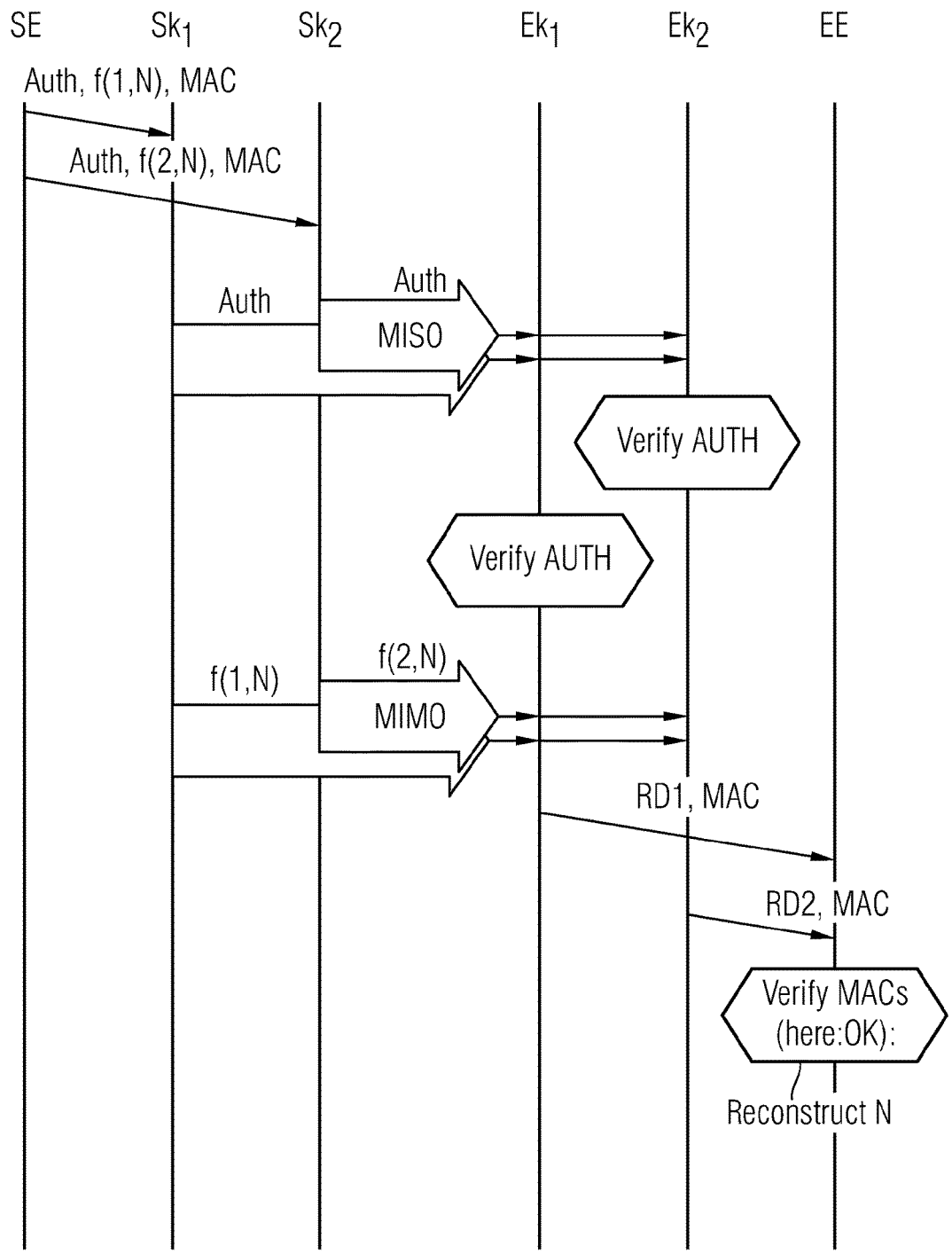
FIG. 3 is a signal diagram representing an embodiment variant of the method.

FIG. 3 shows an embodiment variant of the method. The instances or, as the case may be, nodes EK of receiving-antenna array EAA are in that embodiment variant able to autonomously reconstruct the original message from the received data. Transmitter unit SE sends a message N as well as an authentication token Auth to transmitting nodes SK1 or, as the case may be, SK2 of transmitting-antenna array SAA. That transmission is protected by a cryptographic checksum. Said cryptographic checksum can in a possible variant be different for the two nodes SK1, SK2 of transmitting-antenna array SAA. Using in each case the cooperative MIMO method, the transmitting nodes SK1, SK2 of transmitting-antenna array SAA then send the authentication token they were given to receiving-antenna array EAA over an air interface or, as the case may be, radio interface. Receiving nodes EK1, EK2 of receiving-antenna array EAA check the authentication token that has been sent. If the secret authentication token has been sent is verified by receiving nodes EK1 of receiving-antenna array EAA as being valid, transmitting nodes SK1, SK2 of transmitting-antenna array SAA will then transmit message N to receiving-antenna array EAA using the cooperative MIMO method. Receiving nodes EK1, EK2 in each case reconstruct the message and forward the received reconstructed data RD1, RD2 in each case to receiver unit EE, protecting the message by means of a cryptographic checksum MAC. Said cryptographic checksum can also on the receiving side be different for the two receiving nodes EK1, EK2. From the received and reconstructed data, receiver unit EE determines message N originating from transmitter unit SE. Authentication token Auth and message N are transmitted separately in the embodiment variant shown in FIG. 3. Authentication token Auth and message N can also be transmitted jointly in another embodiment variant. Authentication token Auth is therein transmitted preferably prefixing the data of message N.

Figure 4:
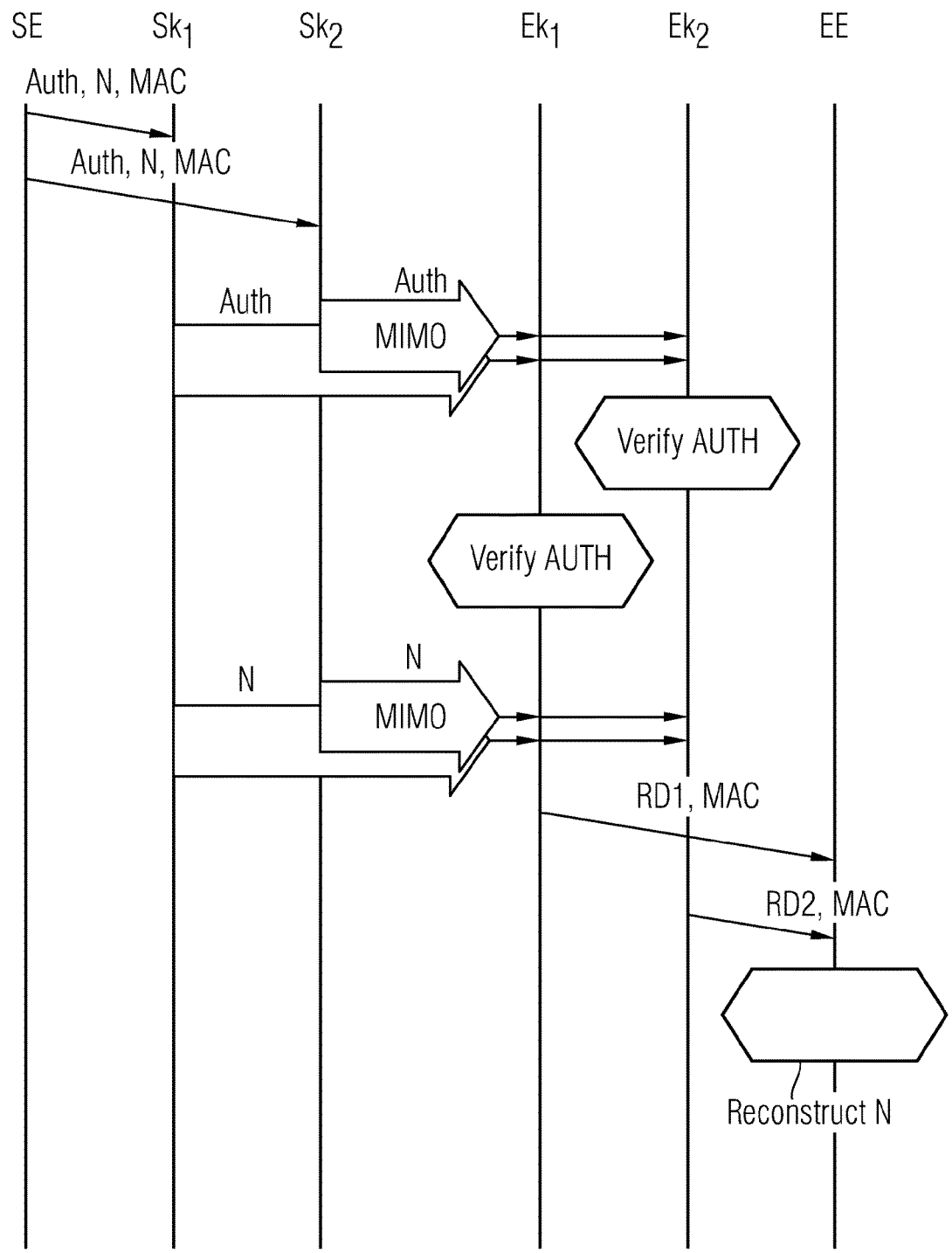
FIG. 4 is another signal diagram representing an embodiment variant of the method.

FIG. 4 is a signal diagram representing another embodiment variant of the method. In that exemplary embodiment according to FIG. 4, the data received by nodes EK of receiving-antenna array EAA is not reconstructed autonomously by said nodes but reconstructing is instead carried out by receiver unit EE. As shown in FIG. 4, transmitter unit SE can transmit message N requiring to be transmitted to transmitting nodes SK of transmitting-antenna array SAA encoded by means of an encoding function. Transmitter unit SE sends f(1,N) or, as the case may be, f(2,N) as well as an authentication token Auth to transmitting nodes SK1, SK2. Transmission can be protected by a cryptographic checksum MAC. As shown in FIG. 4, transmitting nodes SK1, SK2 of transmitting-antenna array SAA send said authentication token to receiving-antenna array EAA using the cooperative MISO method. Receiving nodes EK1, EK2 of receiving-antenna array EAA check the received authentication token. Transmitting nodes SK1, SK2 will then transmit encoded message f(1,N) as well as f(2,N) to receiving-antenna array EAA using the cooperative MIMO method if verifying was successful. Receiving nodes EK1, EK2 of receiving-antenna array EAA transmit received data RD1, RD2 to receiver unit EE, protecting the message by means of a cryptographic checksum MAC. From the data received from receiving nodes EK1, EK2, receiver unit EE reconstructs message N originating from transmitter unit SE. Authentication token Auth and the in this case encoded message N are transmitted separately in the exemplary embodiment shown in FIG. 4. Authentication token Auth and the message can in a variant also be transmitted jointly. Authentication token Auth is therein transmitted preferably prefixing the data of message N.

Figure 5:
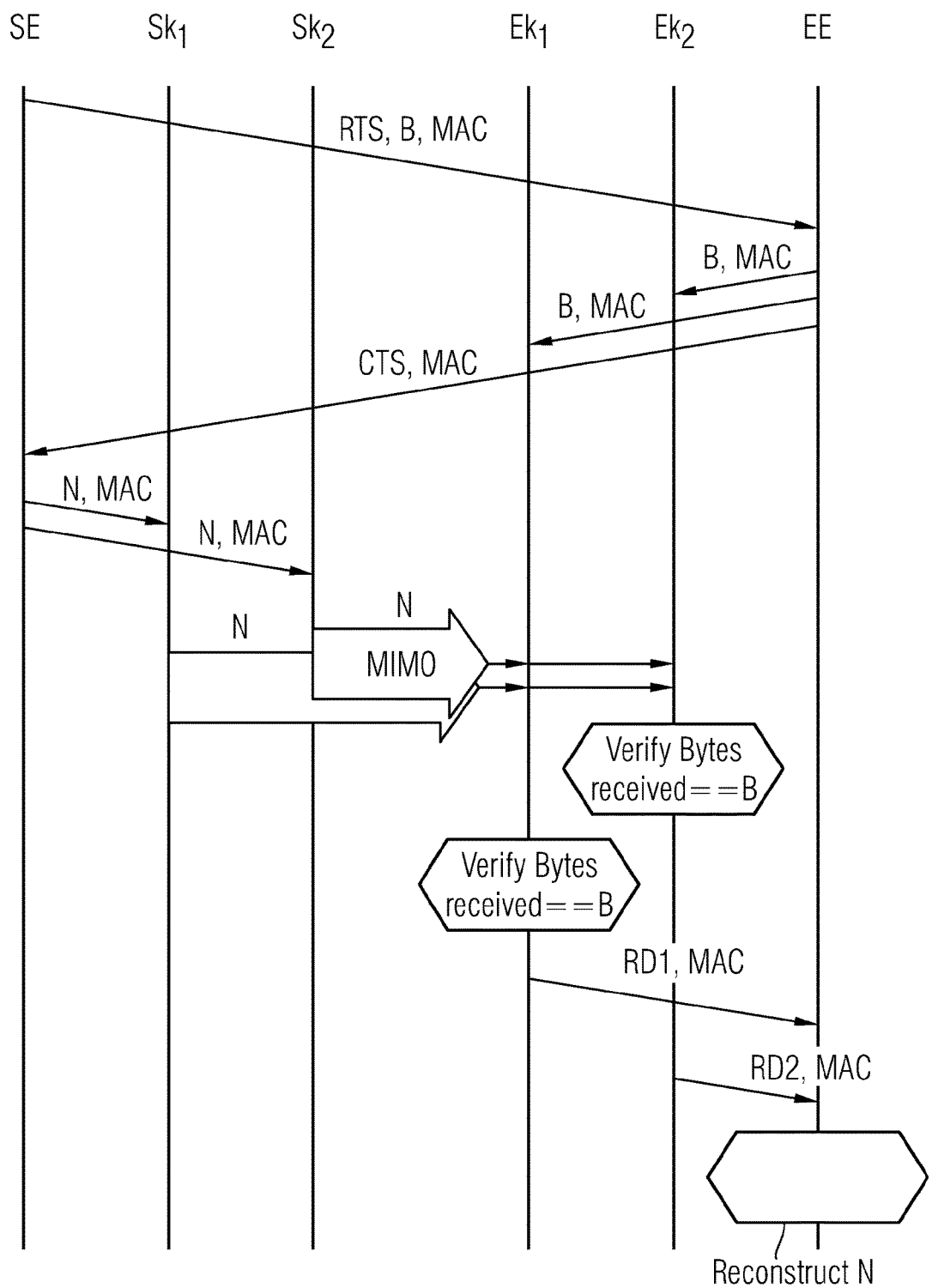
FIG. 5 is another signal diagram representing another embodiment variant of the method.

FIG. 5 shows another exemplary embodiment of the method. Authenticating takes place in that variant using a conveyed number of bytes or, as the case may be, an expected message length. Transmitter unit SE in the exemplary embodiment shown sends for that purpose an RTS message to receiver unit EE. Transmitter unit SE moreover notifies receiver unit EE that it will be sending messages of a certain length, for example a length of B bytes. This message is protected by means of a cryptographic checksum MAC. As shown in FIG. 5, receiver unit EE notifies the instances or, as the case may be, receiving nodes EK of receiving-antenna array EAA, which is to say receiving nodes EK1, EK2, of the number B of expected bytes. These messages are protected by receiver unit EE likewise by means of a cryptographic checksum. Receiver unit EE then notifies transmitter unit SE by means of a CTS message that it is ready to receive messages. That message also can be protected by means of a cryptographic checksum. Message N requiring to be transmitted is then sent by transmitter unit SE to the instances or, as the case may be, nodes of transmitting-antenna array SAA, meaning to transmitting nodes SK1, SK2. Said transmitting nodes SK1, SK2 then dispatch the message to receiving-antenna array EAA using the cooperative MIRO method. The instances or, as the case may be, receiving nodes EK of receiving-antenna array EAA check whether they have obtained the correct number of bytes, or, as the case may be whether the received data corresponds to the expected message length. Only if that is the case will receiving nodes EK of receiving-antenna array EAA forward received data RD1, RD2 to receiver unit EE, with its being possible for that to take place protected by means of a cryptographic checksum MAC. From the data forwarded by receiving nodes EK, receiver unit EE then reconstructs message N originating from transmitter unit SE.

What is claimed is:

1. A method for securely transmitting a message from a transmitter unit to a receiver unit, the method comprising:
sending the message from the transmitter unit to each of a plurality of transmitting nodes of a transmitting-antenna array,
forwarding the message from each of the plurality of transmitting nodes of the transmitting-antenna array to a receiving-antenna array having a plurality of receiving nodes, such that each of the plurality of receiving nodes receives multiple instances of the message from the plurality of transmitting nodes;
receiving at each receiving node authentication data originating from the transmitter unit, the authentication data comprising data usable for verification and identification of an origin of the message;
verifying by each receiving node of the receiving-antenna array, based on the authentication data received by that receiving node, that each instance of the message received at that receiving node has originated from an authorized transmitter unit; and
forwarding of a verified message as originating from an authorized transmitter unit to the receiver unit by the plurality of receiving nodes.

2. The method according to claim 1, wherein the authentication data comprises an authentication token.

3. The method according to claim 2, wherein the authentication token is formed by a generated random value previously exchanged between the transmitter unit and receiver unit.

4. The method according to claim 2, wherein the authentication token is formed by a value of a hash chain.

5. The method according to claim 1, wherein verifying of the received message by the receiving nodes being performed using an expected message length.

6. The method according to claim 1, wherein verifying of the received message is performed using an expected transmission pattern.

7. The method according to claim 1, wherein each receiving node of the receiving-antenna array reconstructs on the basis of the verified message received by it a message containing transmission errors emitted by the transmitting nodes of the transmitting-antenna array and forwarding it to the receiver unit for finally reconstructing the message that has been sent.

8. The method according to claim 7, comprising the receiver unit, on the basis of the verified messages that were forwarded to the receiver unit by the receiving nodes of the receiving-antenna array and which contain transmission errors, reconstructing the message emitted by the transmitting nodes of the transmitting-antenna array.

9. The method according to claim 1, wherein the receiving nodes of the receiving-antenna array forwards the verified message respectively received by them directly to the receiver unit, and wherein the receiver unit reconstructs the message emitted by the transmitting nodes of the transmitting-antenna array on the basis of all the verified messages forwarded to said unit by the receiving nodes.

10. The method according to claim 1, wherein the transmitting nodes of the transmitting-antenna array transmitting the message to the receiving nodes of the receiving-antenna array in encoded form.

11. A system for securely transmitting a message from a transmitter unit to a receiver unit, comprising:
a transmitter unit which is connected to a transmitting-antenna array having a plurality of transmitting nodes, each transmitting node having a separate antenna;
a receiver unit which is connected to a receiving-antenna array having a plurality of receiving nodes, each receiving node having a separate antenna;
wherein the transmitter unit is configured to send the message to each of the plurality of transmitting nodes of the transmitting-antenna array,
wherein each of the plurality of transmitting nodes of the transmitting-antenna array is configured to forwarding the message received from the transmitter unit to the plurality of receiving nodes of the receiving-antenna array, such that each receiving node receives multiple instances of the message from the plurality of transmitting nodes;
wherein each of the plurality of receiving nodes of the receiving-antenna array is configured to:
receive authentication data originating from the transmitter unit, the authentication data comprising data usable for verification and identification of an origin of the message;
verify, based on the received authentication data, that each instance of the message received at that receiving node has originated from an authorized transmitter unit; and
forward a verified message as originating from an authorized transmitter unit to the receiver unit.

12. The system according to claim 11, wherein verifying of the received message by each receiving node of the receiving-antenna array is performed using an authentication token, using an expected message length, or using an expected transmission pattern.

13. A receiving node of a receiving-antenna array comprising a plurality of receiving nodes, the receiving node comprising:
an antenna; and
the receiving node configured to:
receive authentication data originating from a transmitter unit, the authentication data comprising data usable for verification of an origin of a message originated from the transmitter unit;
receive, from each of a plurality of transmitting nodes of a transmitting-antenna array connected to a transmitter unit, the message originated from the transmitter unit, such that the receiving node receives multiple instances of the message from the plurality of transmitting nodes;
verify, based on the received authentication data, that each instance of the message received by the receiving node originated from an authorized transmitter unit;
identify, based on the received authentication data, an origin of each instance of the message received by the receiving node, the origin being the authorized transmitter unit; and
forward a verified message as originating from an authorized transmitter unit to the receiver unit.

14. The receiving node according to claim 13, wherein the receiving node is switchable between a MIMO- (Multiple Input Multiple Output) operating mode and a MI-SO (Multiple Input Single Output) operating mode.

15. A receiving device comprising:
a receiving-antenna array comprising a plurality of receiving nodes; and
a receiver unit for reconstructing a message that has been sent,
wherein each receiving nodes of the receiving-antenna array comprises:
an antenna; and
the receiving node configured to:
receive authentication data originating from a transmitter unit, the authentication data comprising data usable for verification of an origin of the message;
receive, from each of a plurality of transmitting nodes of a transmitting-antenna array connected to a transmitter unit, a message originated from the transmitter unit, such that the receiving node receives multiple instances of the message from the plurality of transmitting nodes;
verify, based on the received authentication data, that each instance of the message received by the receiving node originated from an authorized transmitter unit;
identify, based on the received authentication data, an origin of each instance of the message received by the receiving node, the origin being the authorized transmitter unit; and
forward a verified message as originating from an authorized transmitter unit to the receiver unit.

16. A computer program product comprising a non-transitory computer readable media storing program instructions which when executed by one or more processors perform the steps of:

sending the message from a transmitter unit to each of a plurality of transmitting nodes of a transmitting-antenna array, forwarding the message from each of the plurality of transmitting nodes of the transmitting-antenna array to a receiving-antenna array having a plurality of receiving nodes, such that each of the plurality of receiving nodes receives multiple instances of the message from the plurality of transmitting nodes;

receiving at each receiving node authentication data originating from the transmitter unit, the authentication data comprising data usable for verification of an origin of the message;

verifying by each receiving node of the receiving-antenna array, based on the authentication data received by that receiving node, that each instance of the message received at that receiving node has originated from an authorized transmitter unit;

identifying by each receiving node of the receiving-antenna array, based on the received authentication data, an origin of each instance of the message received by the receiving node, the origin being the authorized transmitter unit; and forwarding of a verified message as originating from an authorized transmitter unit to the receiver unit by the plurality of receiving nodes.

17. The computer program product according to claim 16, wherein the authentication data sent by each of the plurality of transmitting nodes comprises an authentication token.

18. The computer program product according to claim 17, wherein the authentication token is formed by a generated random value previously exchanged between the transmitter unit and receiver unit.

* * * * *